(12) United States Patent
Yoon et al.

(10) Patent No.: US 7,392,406 B2
(45) Date of Patent: Jun. 24, 2008

(54) CIRCUIT AND METHOD FOR GENERATING CLOCK SIGNALS FOR CLOCKING DIGITAL SIGNAL PROCESSOR AND MEMORY

(75) Inventors: Seong-Ho Yoon, Yongin (KR); Hyun-Sung Joung, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 10/982,052

(22) Filed: Nov. 6, 2004

(65) Prior Publication Data
US 2006/0031700 A1    Feb. 9, 2006

(30) Foreign Application Priority Data
Aug. 6, 2004    (KR) .................. 10-2004-0062056

(51) Int. Cl.
*G06F 1/32*    (2006.01)
*G06F 1/04*    (2006.01)

(52) U.S. Cl. .................. 713/300; 713/320; 713/322; 713/323; 713/500

(58) Field of Classification Search .................. 713/300, 713/500
See application file for complete search history.

(56) References Cited

U.S. PATENT DOCUMENTS

| | | | | |
|---|---|---|---|---|
| 4,704,723 A | * | 11/1987 | Markland | 377/39 |
| 5,343,439 A | * | 8/1994 | Hoshino | 365/240 |
| 5,794,021 A | * | 8/1998 | Hewitt | 713/501 |
| 5,805,018 A | * | 9/1998 | Harima | 329/304 |
| 5,815,725 A | * | 9/1998 | Feierbach | 713/322 |
| 6,233,264 B1 | * | 5/2001 | Sato | 372/45.01 |
| 6,564,329 B1 | * | 5/2003 | Cheung et al. | 713/322 |
| 6,581,146 B1 | * | 6/2003 | Roohparvar | 711/167 |
| 6,646,944 B2 | * | 11/2003 | Shimano et al. | 365/222 |

(Continued)

FOREIGN PATENT DOCUMENTS

JP    07-311730    11/1995

OTHER PUBLICATIONS

Fundamentals of Digital Logic and Microprocessor Design, Fifth edition, by M. Rafiquzzaman.*

*Primary Examiner*—Nitin C. Patel
(74) *Attorney, Agent, or Firm*—F. Chau & Associates, LLC.

(57) ABSTRACT

A circuit is provided for generating clock signals for clocking a digital signal processor (DSP) and a memory, the circuit comprising of a clock generator for receiving a first clock, generating a DSP clock signal by dividing the first clock by X, and generating a memory clock signal based on the first clock and the DSP clock signal, wherein the DSP is clocked by the DSP clock to generate a write command for writing data into the memory and to generate a read command for reading data in the memory, and data is written into the memory or read from the memory in response to the memory clock signal. A method is also provided for accessing a memory, the method comprising of receiving a first clock; generating a DSP clock signal by dividing by X the first clock; generating a memory clock signal according to the first clock and the DSP clock signal; outputting DSP data in response to the DSP clock signal; and reading data from a memory or writing the DSP data into the memory in response to the memory clock signal.

39 Claims, 9 Drawing Sheets

U.S. PATENT DOCUMENTS

| | | | |
|---|---|---|---|
| 6,741,961 B2* | 5/2004 | Lim | 704/229 |
| 6,941,485 B2* | 9/2005 | Nomura et al. | 713/501 |
| 7,162,657 B2* | 1/2007 | Takahashi et al. | 713/400 |
| 2004/0199390 A1* | 10/2004 | Lim | 704/270 |
| 2005/0047260 A1* | 3/2005 | Yamasaki et al. | 365/232 |
| 2006/0026450 A1* | 2/2006 | Bounitch | 713/600 |

* cited by examiner

CIRCUIT AND METHOD FOR GENERATING CLOCK SIGNALS FOR CLOCKING DIGITAL SIGNAL PROCESSOR AND MEMORY

CROSS-REFERENCE TO RELATED APPLICATION

This application claims priority to Korean Patent Application No. 2004-62056, filed on Aug. 6, 2004, in the Korean Intellectual Property Office.

1. Technical Field

The present invention relates to a circuit and method for generating clock signals for clocking a digital signal processor and a memory.

2. Discussion of the Related Art

A mobile system on chip (SOC) generally includes a digital signal processor (DSP) sub-system and a micro-controlling unit (MCU). The DSP sub-system executes a processing related operation and requires a memory having high capacity.

With demand for ever increasing speed of operation on the part of the DSP and increased memory capacity, timing control for reading and writing between the DSP and the memory become increasingly complex. Since write operation for writing data into the memory from the DSP and read operation for reading data from the memory by the DSP should be done within one clock cycle, the timing margin for memory access becomes smaller.

Figure 1:
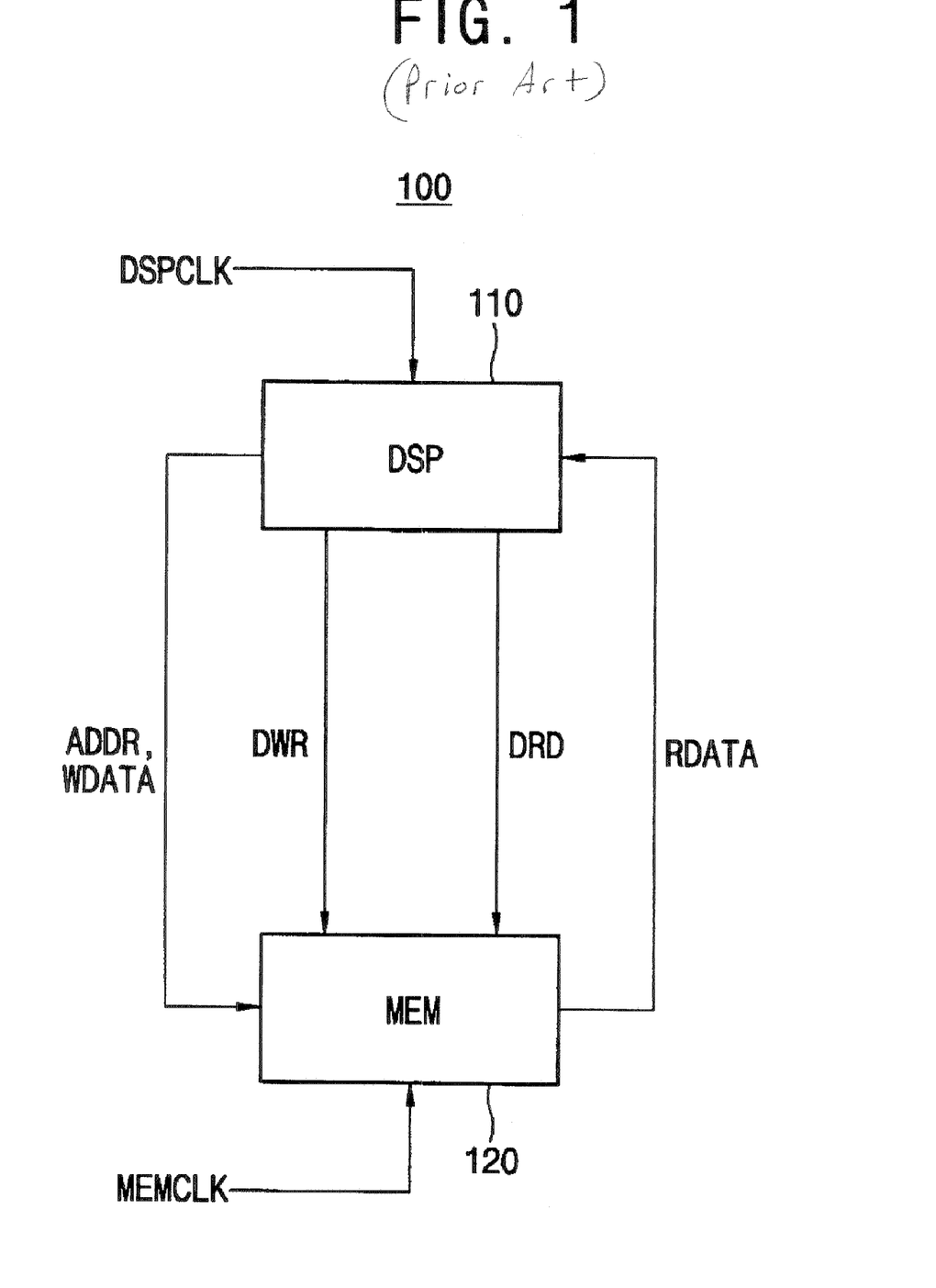
FIG. 1 is a schematic block diagram of a conventional system for receiving and transmitting data between a DSP and a memory for a wireless communication device.
Figure 2:
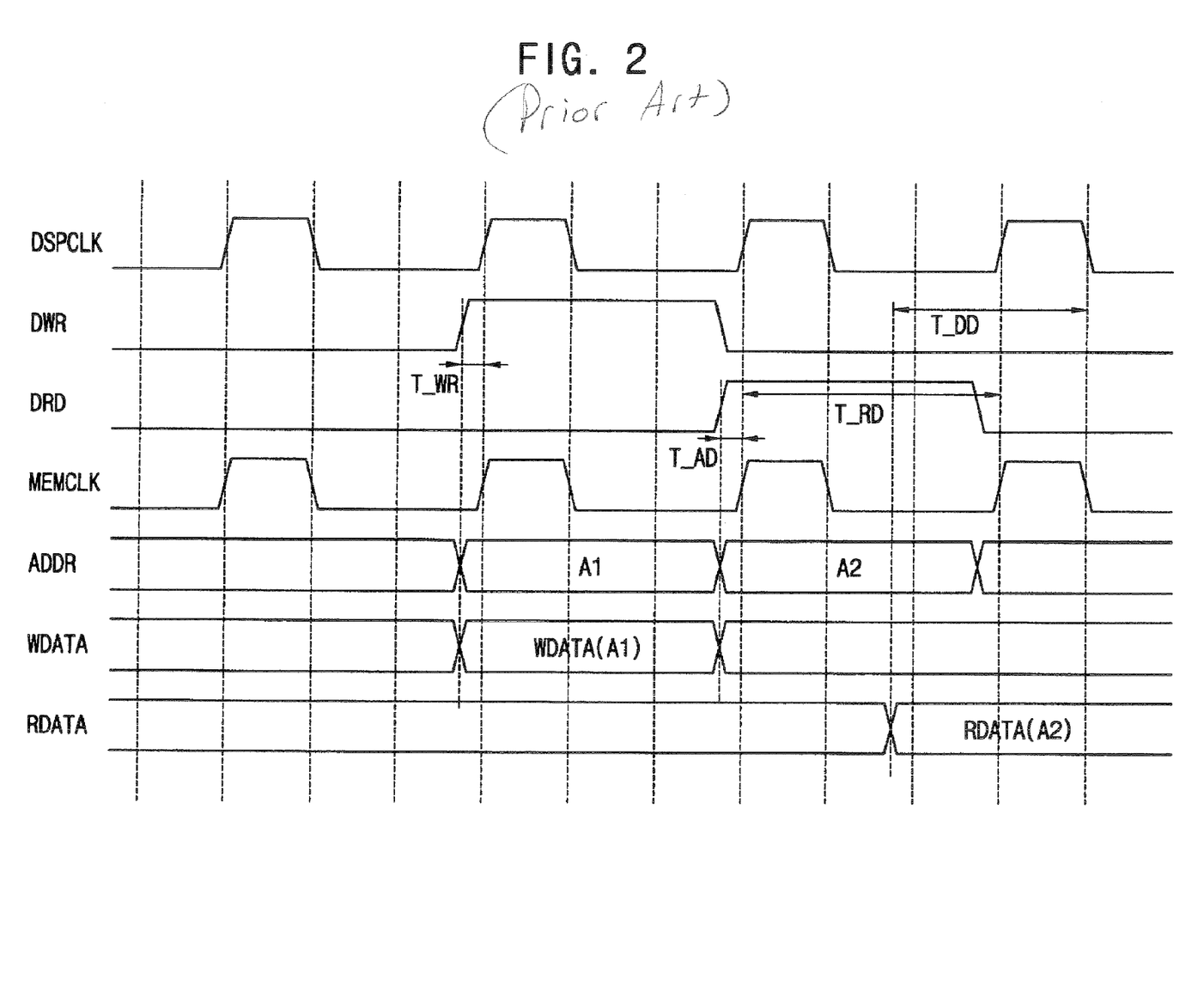
FIG. 2 is a timing diagram of a conventional system for receiving and transmitting data between a DSP and a memory.
Figure 3:
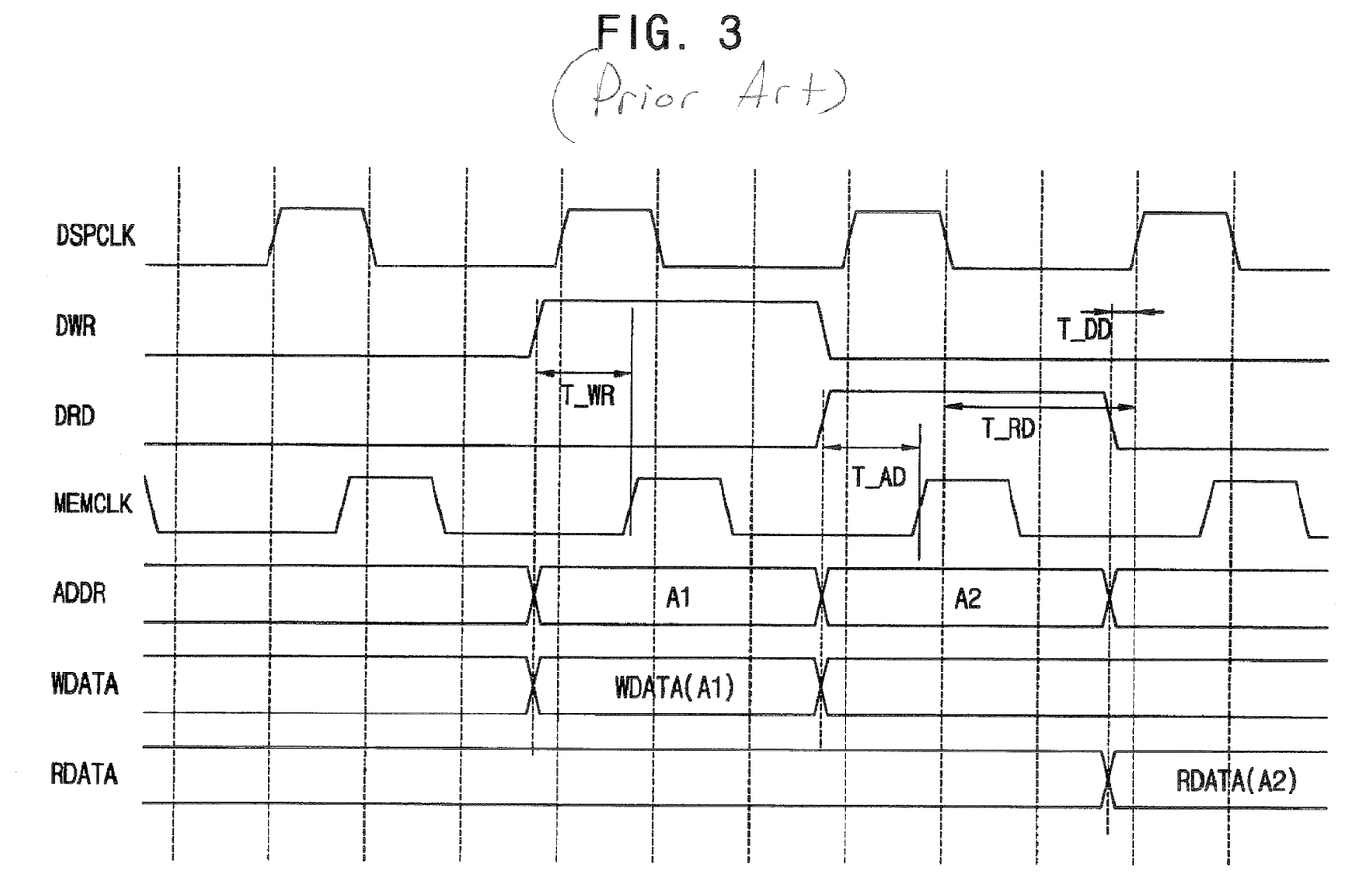
FIG. 3 is another timing diagram of a conventional system for receiving and transmitting data between a DSP and a memory.

FIG. 1 is a block diagram of a conventional system for receiving and transmitting data between a DSP and a memory for a wireless communication device. FIGS. 2 and 3 are timing diagrams of a conventional system for receiving and transmitting data between the DSP and the memory.

Referring to FIGS. 1, 2, and 3, the system 100 for receiving and transmitting data includes a DSP 110 and a memory 120.

The DSP 110 sends a write command DWR to the memory 120 for writing data. According to the write command DWR, the DSP sends a memory address ADDR and data WDATA to the memory 120 between a rising edge and the next rising edge of a DSP clock DSPCLK, then, the data WDATA is written into the memory 120.

The DSP 110 sends a read command DRD to the memory 120 for reading data from the memory 120. According to the read command DRD, the DSP 110 reads data RDATA from the memory 120 between one rising edge and the next rising edge of a DSP clock DSPCLK.

As shown in FIGS. 2 and 3, a read operation or a write operation is performed in the memory 120 when a memory clock transitions, e.g., from low to high, after receiving a read command DRD or a write command DWR, respectively. Buffers or delays (not shown) are typically included in the system 100 for use in latching or buffering the data so that the read/write operation is done within timing margins such as a write command margin T_WR, a read command margin T_RD, an address margin T_AD, and a data transfer margin T_DD. The skewing of clocks to avoid timing violations is referred to as "timing closure".

Since a read operation or a write operation is to be performed within one cycle of the DSP clock DSPCLK, all of the above timing margins cannot be adjusted at the same time. For example, if a read command margin T_RD is increased, an address margin T_AD is reduced. If an address margin T_AD is increased, a data transfer margin T_DD is reduced. As respective timing margins are related to each other, it is often a difficult task to optimize all the timing margins.

SUMMARY OF THE INVENTION

A circuit for generating clock signals for clocking a digital signal processor (DSP) and a memory is provided, the circuit comprising of a clock generator for receiving a first clock, generating a DSP clock signal by dividing the first clock by X, and generating a memory clock signal based on the first clock and the DSP clock signal, wherein the DSP is clocked by the DSP clock to generate a write command for writing data into the memory and to generate a read command for reading data in the memory, and data is written into the memory or read from the memory in response to the memory clock signal.

The clock generator generates a clock-gating input signal by dividing the first clock by X and the memory clock signal is generated according to the first clock, a DSP clock signal, and the clock-gating input signal.

Preferably, the memory clock signal is generated during one of an enabling period of the write command and the enabling period of the read command. The generator of the memory clock signal is in the form of a strobe. The pulse width of the generated memory clock signal is about ½ cycle of a cycle of the first clock. The memory is a synchronous memory.

According to another aspect of the invention, a clock generator includes a counter for counting a first clock; a clock divider for generating a digital signal processor (DSP) clock signal and a clock gating input signal according to a count value output at the counter; and a clock gating circuit for generating a memory clock signal for clocking a memory according to the DSP clock signal, the clock gating input signal, a read command, and a write command.

A clock generating method is also provided, comprising of counting a first clock; dividing a digital signal processor (DSP) clock signal and a clock gating input signal according to a count value of the first clock; and generating a memory clock signal according to the DSP clock signal, the clock gating input signal, a read command, and a write command.

A method is also provided for accessing a memory, the method comprising of receiving a first clock; generating a DSP clock signal by dividing by X the first clock; generating a memory clock signal according to the first clock and the DSP clock signal; outputting DSP data in response to the DSP clock signal; and reading data from a memory or writing the DSP data into the memory in response to the memory clock signal.

According to still another aspect of the invention, a modem is provided, comprising a clock divider for generating a DSP clock signal and a clock gating input signal by dividing a first clock by X, X is a natural number equal to or greater than 2, and for generating a memory clock signal according to the first clock, the DSP clock signal, and the clock gating input signal, wherein the memory clock signal has an active period of about ½ cycle of the first clock; and a digital signal processor (DSP) for outputting DSP data in response to the DSP clock signal and for generating a write command for writing the DSP data into a memory and a read command for reading data from the memory, wherein the writing of the DSP data into the memory or the reading of the data from the memory is in response to the memory clock signal.

DETAILED DESCRIPTION OF PREFERRED EMBODIMENTS

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor Boolean operations (e.g., inversion) without being considered different signals.

Figure 4:
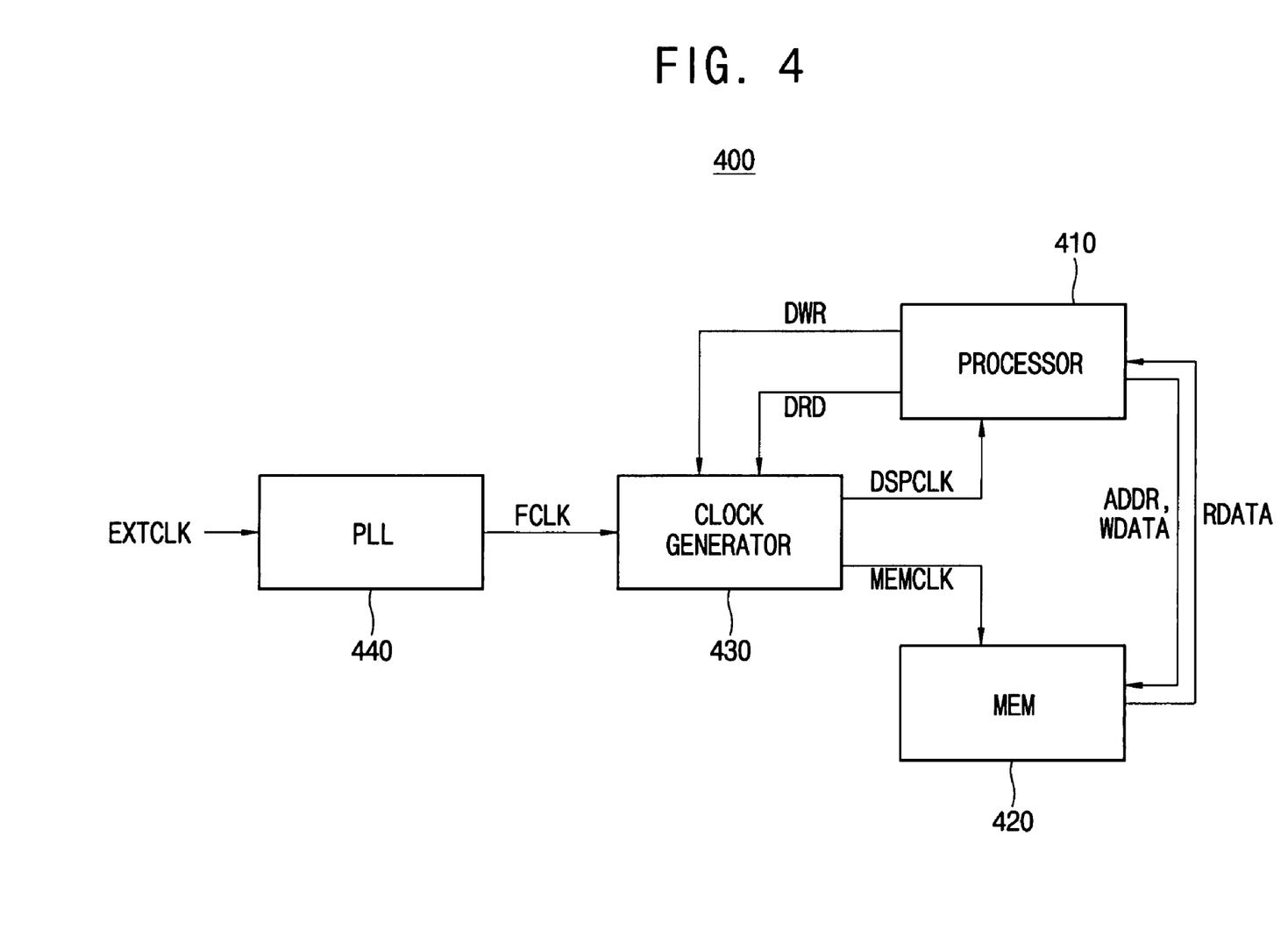
FIG. 4 is a schematic block diagram of a system for receiving and transmitting data between a processor and a memory according to an embodiment of the present invention.

FIG. 4 is a schematic block diagram of a system for receiving and transmitting data between a processor and a memory according to an embodiment of the present invention. This system can be applicable for use in a number of DSP-based devices, for example, as a modem chip for a wireless communication device. It is appreciated that the present disclosure is not limited to a modem chip, rather it can be applied to other systems having a memory and a processor.

Referring to FIG. 4, the system 400 includes: a processor 410 for processing data and generating commands such as a write command DWR and a read command DRD; a memory 420 for storing data or the processed data in the processor 410; and a circuit for generating clock signals for clocking the processor 410 and the memory 420. Preferably, the processor 410 is a digital signal processor (DSP). Hereinafter, the processor 410 is referred to as a DSP.

According to an embodiment of the present invention, the circuit includes a clock generator 430 for receiving a first clock FCLK, generating a DSP clock signal DSPCLK by dividing the first clock FCLK by X (wherein X is a natural number), and generating a memory clock signal MEMCLK based on the first clock FCLK and the DSP clock signal DSPCLK. The DSP 410 is clocked by the DSP clock DSPCLK to generate a write command DWR for writing data into the memory 420 and to generate a read command DRD for reading data in the memory 420, and data is written into the memory 420 or read from the memory 420 in response to the memory clock signal MEMCLK.

According to an embodiment of the present invention, the memory 420 is preferably a synchronous memory.

The clock generator 430 receives the first clock FCLK which is generated by a phase locked loop (PLL) after receiving an external clock signal EXTCLK. The frequency of the external clock signal EXTCLK is, for example, about 810 MHz and the frequency of the first clock FCLK is, for example, about 273 MHz. According to this exemplary embodiment, the clock generator 430 divides the first clock FCLK by three (3). Thus, X is 3 for the present embodiment, but it is appreciated that X can be any natural number.

Figure 5:
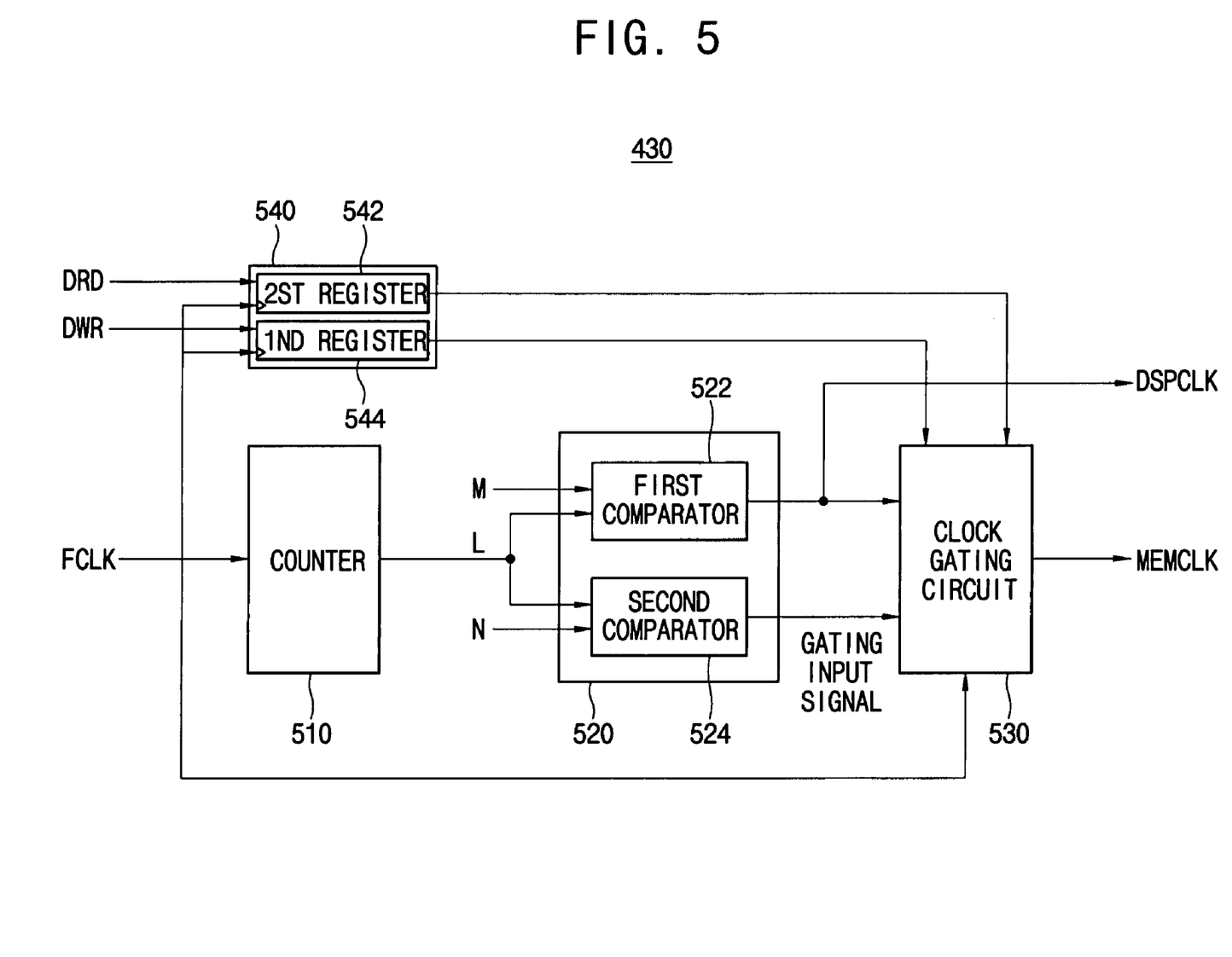
FIG. 5 is a schematic block diagram of a clock generator in FIG. 4.

FIG. 5 is a schematic block diagram of the clock generator 430 in FIG. 4.

Referring to FIG. 5, the clock generator 430 includes: a counter 510 for counting a first clock FCLK and outputting a count value at output L; a clock divider 520 for generating the DSP clock signal DSPCLK and a clock gating input signal; and a clock gating circuit 530 for generating the memory clock signal MEMCLK, which is used for clocking the memory 420.

According to an embodiment of the present invention, the clock divider 520 includes a first comparator 522 for comparing between a count value of the first clock output at the counter 510 and a first given value M and a second comparator 524 for comparing a count value of the first clock output at the counter 510 and a second given value N. The DSP clock signal DSPCLK is generated by the first comparator 522 and the clock gating input signal is generated by the second comparator 524.

According to an embodiment of the present invention, the clock generator 430 can further include a register block 540 for storing the read command DRD and the write command DWR and outputting the read command DRD and the write command DWR in response to the first clock FCLK. The register block 540 includes a first register 542 and a second register 544 for storing the read command DRD and the write command DWR, respectively. According to this exemplary embodiment, the first and second registers 542, 544 can be flip-flops.

The first clock FCLK is connected to the counter 510, the clock gating circuit 530, and the register block 540 for clocking each of the connected components.

Figure 6:
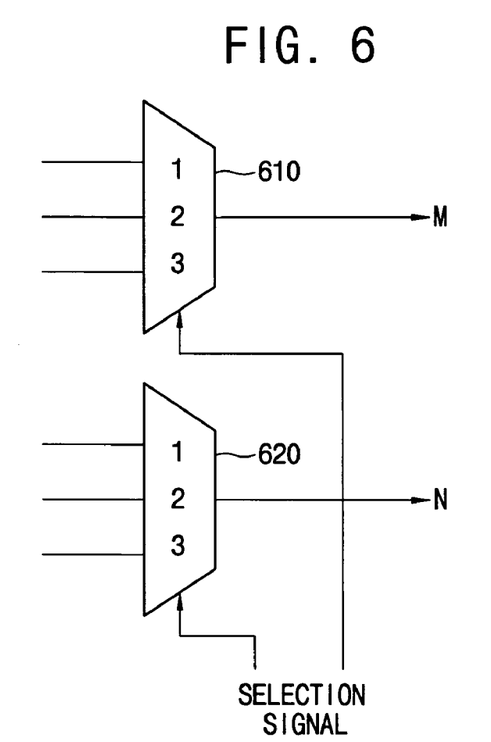
FIG. 6 is a schematic block diagram of a given value generator in FIG. 5.

FIG. 6 is a schematic block diagram of a given value generator 600 for generating the first given value M and the second given value N in FIG. 5.

Referring to FIG. 6, the given value generator 600 includes a first selector 610 and a second selector 620 which are, for example, composed of multiplexers. The first selector 610 and the second selector 620 select the first given value M and the second given value N, respectively, in response to a selection signal. The first value M is preferably a number different from the second value N. For example M=1, N=2. In such case, the selection signal applied to 610 selects '1' and the selection signal applied to second selector 620 selects '2'. According to this exemplary embodiment, the first clock FCLK is divided by a count of 3. In such case, the first and second selectors 610, 620 can select from a count of 1 to 3. It is appreciated that if the first clock FCLK is to be divided by a number X, the first and second selectors 610, 620 are X-to-one multiplexer and 1 to X can be selected. For example, if X=4, a 4 to 1 multiplexer is used and 1 to 4 can be selected.

Figure 7:
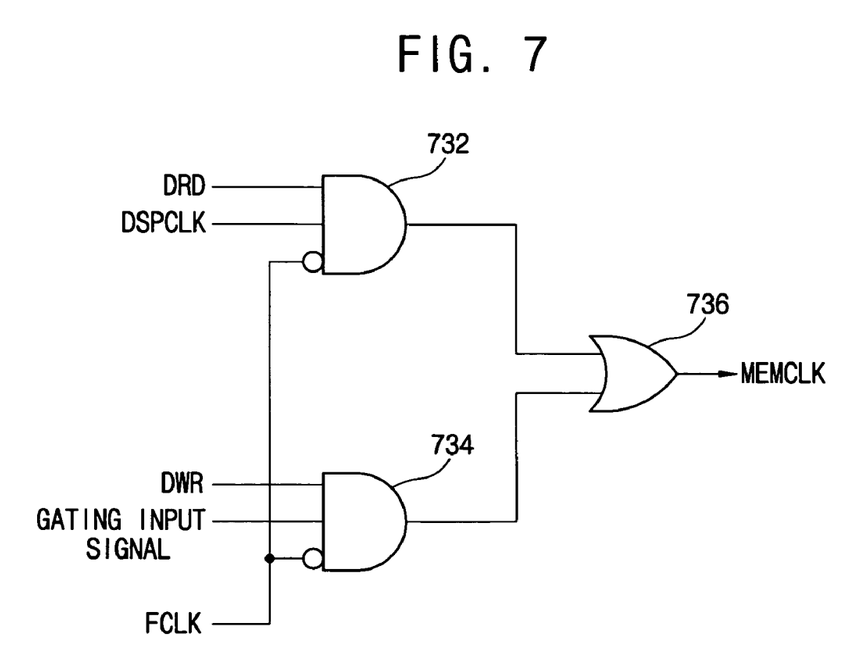
FIG. 7 is a clock gating circuit included in the clock generator of FIG. 5.

FIG. 7 shows a clock gating circuit 530 of the clock generator 430 of FIG. 5.

Referring to FIG. 7, the clock gating circuit 530 includes AND logic gates 732, 734 which receive at least the DSP clock signal DSPCLK, the clock gating input signal, respectively, and an OR logic gate 736 connected to outputs of the AND gates 732, 734.

The AND logic gates 732, 734 include at least two AND logic gates. The first AND logic gate 732 receives the read command DRD from the first register 542, the DSP clock signal DSPCLK, and an inversed first clock FCLK from the PLL 440, and executes an AND operation. The second AND logic gate 734 receives the write command DWR from the second register 544, the clock gating input signal, and an inversed first clock FCLK from the PLL 440, and executes an AND operation.

The OR logic gate 736 receives the outputs from the first and second AND logic gates 732, 734 and generates the memory clock signal MEMCLK by an OR operation.

It is readily appreciated by one skilled in the art that the AND logic gates 732, 734 and the OR logic gate 736 can be replaced by other logic gates having equivalent Boolean expressions to accomplish the same or equivalent gating operations.

Hereinafter, an operation of the circuit for generating clock signals for clocking the processor 410 and the memory 420 will be described.

Figure 8:
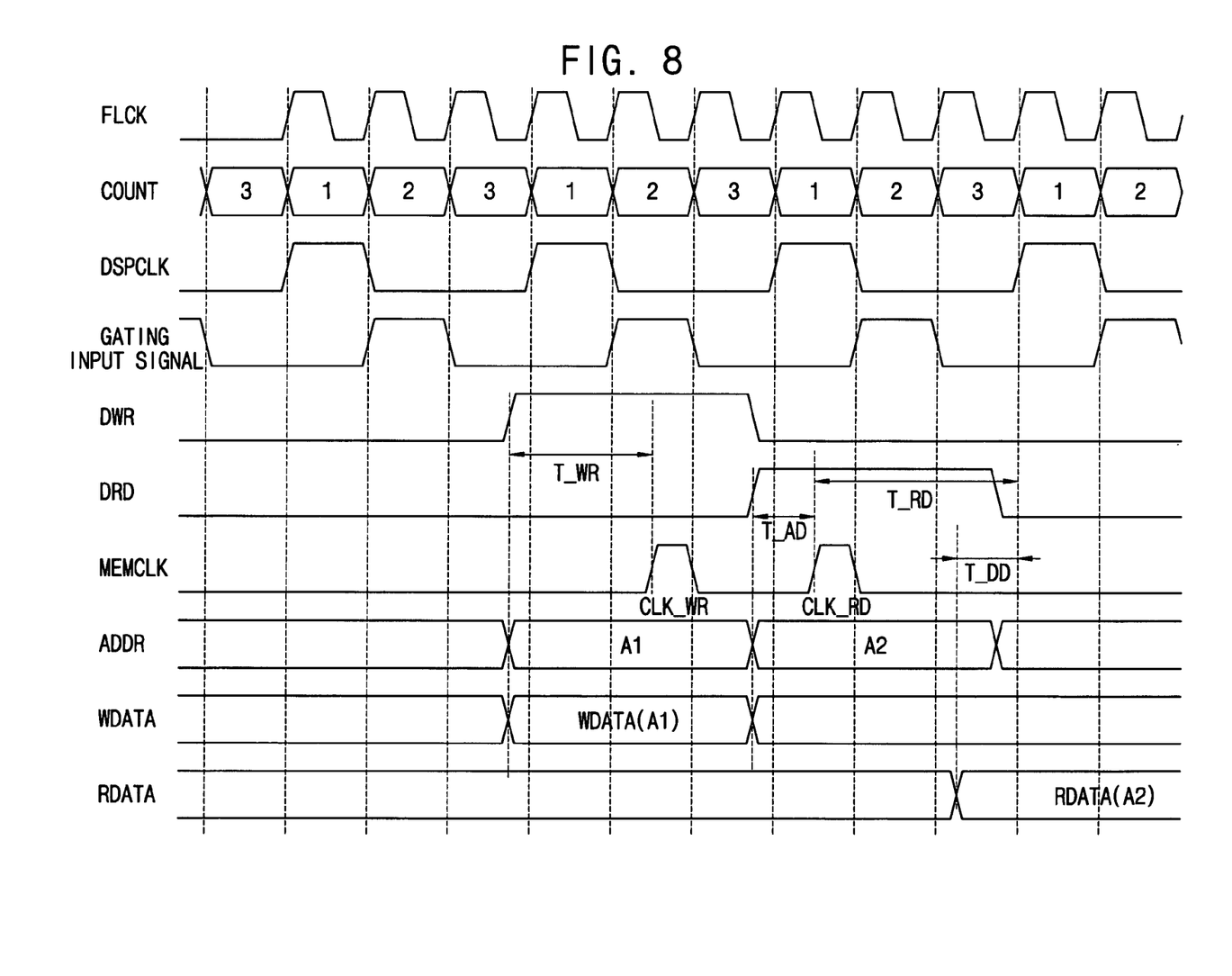
FIG. 8 is a timing diagram for receiving and transmitting data between a DSP and a memory.

FIG. 8 is a timing diagram for receiving and transmitting data between the DSP 410 and the memory 420.

Referring to FIGS. 4, 5, 7, and 8, the PLL 440 receives an external clock EXTCLK and generates a first clock FCLK. The clock generator 430 receives the first clock FCLK. The counter 510 receives the first clock FCLK, counts the number of the clock cycles, and outputs a count at output L. For example, if the counter 510 is set to count to 3, the count will repeat every three FCLK 3 cycles.

The first comparator 522 compares the count value output at L and the first given value M and the second comparator 524 compares the count value L and the second given value N. The M and N values are preselected. For example, if M is preset equal to '1', the DSP clock signal DSPCLK is periodically generated when the count is equal to '1'. Likewise, if N is set to '2', the gating input signal outputs a replica of FCLK when the count reaches '2'.

Meanwhile, the DSP 410 sends a read command DRD for reading data from the memory 420 or a write command DWR for writing data into the memory 420 to the clock generator 430. The DSP 410 sends data WDATA(A1) and an address A1 to the memory 420 in response to the write command DWR. However, if the memory clock signal MEMCLK for operating the memory 420 does not transition, e.g., to "high" from "low", the data WDATA(A1) is not written into memory.

Referring to FIGS. 7 and 8, a write pulse in the form of a strobe, CLK_WR is generated at the output of the OR logic gate 736 at MEMCLK when the write command DWR is "high", the gating input is "high" (the count value is '2'), and the inverse of the first clock FCLK are inputted into the AND gate 734 of the clock gating circuit 530. The read command DRD is "low" when the write command is "high" and visa versa. When the write pulse CLK_WR is generated, the data WDATA(A1) is written into the address A1 of the memory 420.

Likewise, a read pulse (or strobe) CLK_RD is generated as the memory clock signal MEMCLK through the OR logic gate 736 when the read command DRD is "high", the DSP clock DSPCLK is pulsed when the count value is '1', and the inverse of the first clock FCLK at a 'low' level are present at the AND gate 732 of the clock gating circuit 530. When the read pulse CLK_RD is generated, the DSP 410 reads the data WDATA(A2) from the address A2 of the memory 420. Thus, the write pulse CLK_WR and the read pulse CLK_RD are generated when the first clock FCLK is low and each width of the write pulse CLK_WR and the read pulse CLK_RD is about half cycle of the first clock FCLK.

In the conventional circuit and timing diagram shown in FIGS. 1, 2, and 3, several delays and repeatedly testing may be employed for generating optimum memory clock signals. That is, since data read and data write should be within one cycle of the DSP clock signal DSPCLK, respectively, timing violation is protected by artificially skewing clocks by adding buffers or delays within the data write (T_WR), data read (T_RD), address (T_AD), and data transfer (T_DD) margins. According to an embodiment of the present invention, the generation of the memory clock signal MEMCLK is related to the DSP clock signal DSPCLK and memory access is accomplished within the data write (T_WR), data read (T_RD), address (T_AD), and data transfer (T_DD) margins and within one cycle of the DSP clock signal DSPCLK. Since the write strobe CLK_WR and read strobe CLK_RD are generated when the write command DWR and the read command DRD are activated, respectively, there is reduced duty cycle at the DSPCLK and MEMCLK signals, thereby reducing power consumption.

Figure 9:
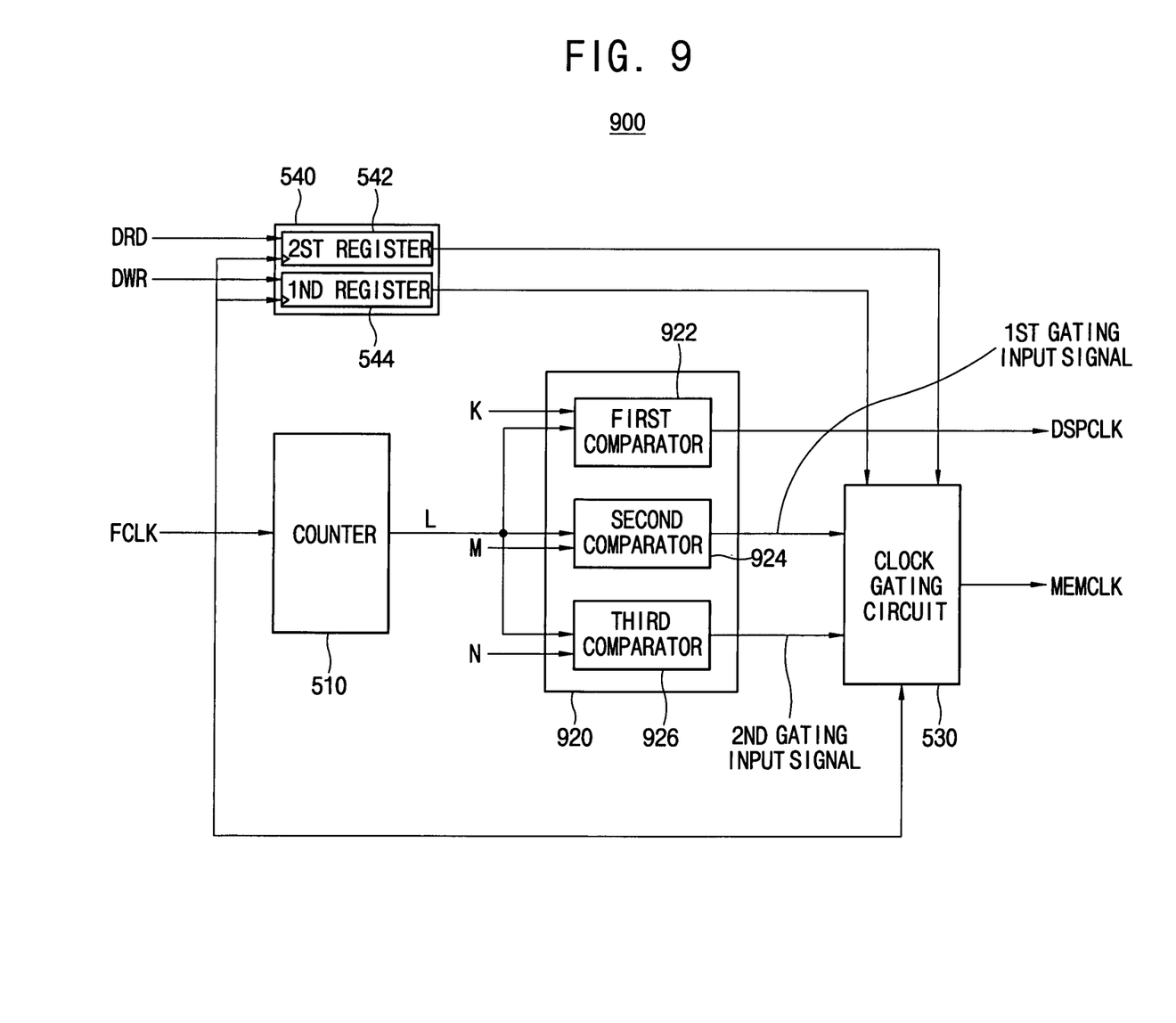
FIG. 9 is a schematic block diagram of another clock generator in FIG. 4.

FIG. 9 shows a block diagram of a clock generator according to another embodiment of the present invention. Referring to FIG. 9, the clock generator 900 are similar to the clock generator 430 in FIG. 5 except the clock divider 520 of FIG. 5 is replaced by the clock divider 920. As shown, the first and second comparators 522, 524 of FIG. 5 are replaced by first, second, and third comparators 922, 924, and 926 in the clock divider 920 in FIG. 9.

According to the present embodiment, a second gating input signal is additionally generated. Thus, each of the first, second, and third given values K, M, N can output a pulse when the count value at L is any one of one (1) to three (3). If the first given value K is set to be the same as the second given value M, FIG. 9 operates the same as the circuit shown in FIG. 5.

The first comparator 922 compares the count value at L and the first given value K. In case the first given value K is "1", the DSP clock signal DSPCLK is periodically generated when the count value at L is "1". Further, in case the second given value M is "2", the second comparator 924 generates a first gating input signal. In case the third given value N is "3", the third comparator 926 generates a second gating input signal. The clock gating circuit 530 receives the first gating input signal and the second gating input signal, and generates a memory clock signal MEMCLK in response to the read command DRD or the write command DWR.

Figure 10:
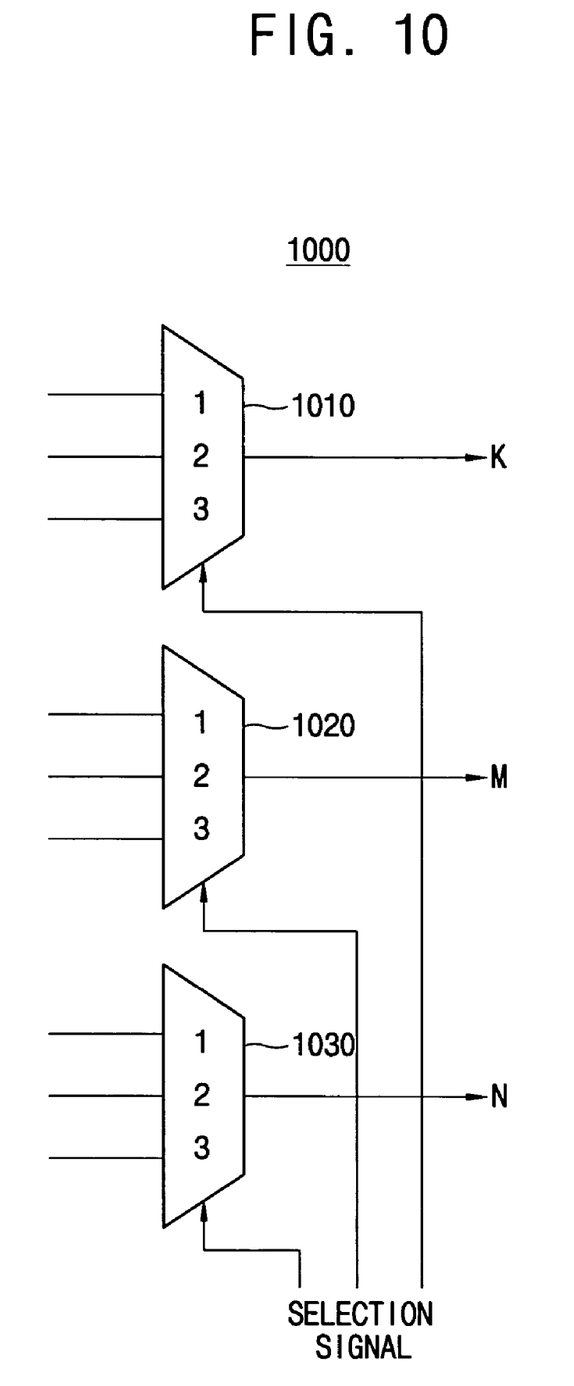
FIG. 10 is a schematic block diagram of a given value generator in FIG. 9.

FIG. 10 is a schematic block diagram of a given value generator to generate the given values K, M, and N. Referring to FIG. 10, the given value generator 1000 includes a first selector 1010, a second selector 1020, and a third selector 1030 which are composed of X-to-1 multiplexers. In this case, X is '3'. The first selector 1010, the second selector 1020, and the third selector 1030 select the first given value K, the second given value M, and the given third value N, respectively, in response to a respective selection signal. If the first clock FCLK is to be divided by 3, the first, second, and third selectors 1010, 1020, 1030 can select one of one (1) to three (3). It is appreciated that if the first clock FCLK is to be divided into 'X' to generate the DSP clock DSPCLK (where X is a natural number equal or greater than 2), the first, second, third selectors 1010, 1020, 1030 can select one of X.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit for generating clock signals for clocking a digital signal processor (DSP) and a memory, the circuit comprising:

a clock generator for receiving a first clock, generating a DSP clock signal using a first comparator by dividing the first clock by a preselected value X, where X is a natural number greater than 0, generating a gating input signal using a second comparator, and generating a memory clock signal based on the first clock, the gating input signal, and the DSP clock signal, wherein the DSP is clocked by the DSP clock signal to generate a write command for writing data into the memory and to generate a read command for reading data in the memory, wherein the write and read commands are input to the clock generator to control the generation of the memory clock signal and wherein data is written into the memory or read from the memory in response to the memory clock signal.

2. The circuit of claim 1, wherein the clock generator generates the clock-gating input signal by dividing the first clock by X and wherein the memory clock signal is generated according to the first clock, a DSP clock signal, and the clock-gating input signal.

3. The circuit of claim 2, wherein the memory clock signal is generated during one of an enabling period of the write command and the enabling period of the read command.

4. The circuit of claim 3, wherein the memory clock signal is generated in the form of a strobe.

5. The circuit of claim 3, wherein a pulse width of the memory clock signal is about ½ cycle of a cycle of the first clock.

6. The circuit of claim 1, wherein the memory is a synchronous memory.

7. A clock generator comprising:
a counter for counting a first clock;
a clock divider for generating a digital signal processor (DSP) clock signal using a first comparator and a clock gating input signal using a second comparator according to a count value output at the counter; and
a clock gating circuit for generating a memory clock signal for clocking a memory according to the DSP clock signal, the clock gating input signal, a read command, and a write command.

8. The clock generator of claim 7, wherein the DSP clock signal is generated by a first comparator for comparing between a count value of the first clock output at the counter and a first given value.

9. The clock generator of claim 7, wherein the write command and the read command are generated in a digital signal processor (DSP).

10. The clock generator of claim 7, further comprising a register block for storing the read command and the write command and outputting the read command and the write command in response to the first clock.

11. The clock generator of claim 10, wherein the register block comprises a first register and a second register for storing the read command and the write command, respectively.

12. The clock generator of claim 7, wherein the clock gating circuit comprises AND logic gates which receive at least the DSP clock signal, the clock gating input signal, and an OR logic gate connected to outputs of the AND gates.

13. The clock generator of claim 12, wherein the outputs of a first register having a read command and the DSP clock signal are input to a first AND logic gate and the outputs of a second register having a write command and the clock gating input signal are input to a second AND logic gate.

14. The clock generator of claim 13, wherein the first AND logic gate and the second AND logic gate receive the first clock.

15. The clock generator of claim 7, wherein the first clock is received from a phase locked loop (PLL) and the DSP clock signal is used to clock a DSP.

16. The clock generator of claim 7, wherein a first pulse of the memory clock signal is generated when the count value of the first clock output at the counter and the first given value are the same.

17. The clock divider of claim 7, wherein a second pulse of the memory clock signal is generated when the count value of the first clock output at the counter and the second given value are the same.

18. A clock generator comprising:
a counter for counting a first clock;
a clock divider for generating a digital signal processor (DSP) clock signal and a clock gating input signal according to a count value output at the counter; and
a clock gating circuit for generating a memory clock signal for clocking a memory according to the DSP clock signal, the clock gating input signal, a read command, and a write command,
wherein the DSP clock signal is generated by a first comparator for comparing between a count value of the first clock output at the counter and a first given value, and
wherein the clock gating input signal is generated by a second comparator for comparing a count value of the first clock output at the counter and a second given value.

19. A clock generating method comprising:
counting a first clock;
generating a digital signal processor (DSP) clock signal using a first comparator and a clock gating input signal using a second comparator according to a count value of the first clock; and
generating a memory clock signal according to the DSP clock signal, the clock gating input signal, a read command, and a write command.

20. The method of claim 19, wherein the DSP clock signal is generated by comparison between a counting value of the first clock and a first given value.

21. The method of claim 20, wherein the clock gating input signal is generated by comparison between a counting value of the first clock and a second given value.

22. The method of claim 19, wherein the write command and the read command are generated in a digital signal processor (DSP).

23. The method of claim 19, wherein the memory clock signal is generated in a clock gating circuit and the clock gating circuit comprises at least first and second AND gates and an OR gate connected to outputs of the AND gates.

24. The method of claim 23, wherein the first AND gate receives the read command and the DSP clock signal, and the second AND gate receives the write command and the clock gating input signal.

25. The method of claim 24, wherein the first AND gate and the second AND gate further receive the first clock.

26. The method of claim 19, wherein the read command and the write command have opposite phases, respectively.

27. The method of claim 19, wherein the first clock is received from a phase locked loop (PLL), the DSP clock signal is an input signal for a DSP, and the memory clock signal is a clock signal for a memory.

28. A clock generating method comprising:
counting a first clock;
generating a digital signal processor (DSP) clock signal and a clock gating input signal according to a count value of the first clock; and generating a memory clock signal according to the DSP clock signal, the clock gating input signal, a read command, and a write command, wherein the DSP clock signal is generated by comparison between a counting value of the first clock and a first given value, wherein the clock gating input signal is generated by comparison between a counting value of the first clock and a second given value, and wherein the DSP clock signal and the clock gating input signal are generated in a comparator and the comparator comprises: a first comparator for comparison between the counting value of the first clock and the first given value; and a second comparator comparison between the counting value of the first clock and the second given value.

29. A method for accessing a memory, the method comprising:

receiving a first clock;

generating a DSP clock signal using a first comparator by dividing the first clock by a preselected value X, where X is a natural number greater than 0;

generating a gating input signal using a second comparator;

generating a memory clock signal according to the first clock, the gating input signal, and the DSP clock signal;

outputting DSP data in response to the DSP clock signal; and reading data from a memory or writing the DSP data into the memory in response to the memory clock signal.

30. The method of claim 29, wherein X is equal to or greater than two.

31. The method of claim 29, wherein the step of reading the data from a memory or writing the processed data into the memory is performed according to a read command or a write command, respectively, wherein the read and write command are generated in a digital signal processor (DSP).

32. The method of claim 29, wherein a clock-gating input signal is generated by dividing by X the first clock, X being equal to or greater than two, and the memory clock signal is generated according to the first clock, a DSP clock signal, and the clock-gating input signal.

33. The method claim 29, wherein the memory clock signal is generated during an enabling period of one of the write command and the read command.

34. The method of claim 33, wherein the memory clock signal is a strobe signal generated during an enabling period of one of the write command and the read command.

35. The method of claim 29, wherein a pulse width of the memory clock signal is about ½ of a cycle of the first clock.

36. The method of claim 29, wherein the memory is a synchronous memory.

37. A modem comprising:

a clock divider for generating a DSP clock signal using a first comparator and a clock gating input signal using a second comparator by dividing a first clock by X, X is a natural number equal to or greater than 2, and for generating a memory clock signal according to the first clock, the DSP clock signal, and the clock gating input signal; and a digital signal processor (DSP) for outputting DSP data in response to the DSP clock signal and for generating a write command for writing the DSP data into a memory and a read command for reading data from the memory, wherein the writing of the DSP data into the memory or the reading of the data from the memory is in response to the memory clock signal.

38. The modem of claim 37, further comprising a communication unit for facilitating communication of the modem with an external device.

39. The modem of claim 37, wherein the memory clock signal has an active period of about ½ cycle of the first clock.

* * * * *